July 24, 1956 E. WILDHABER 2,755,643
FLEXIBLE SEAL FOR UNIVERSAL JOINTS
Filed July 5, 1950 2 Sheets-Sheet 1
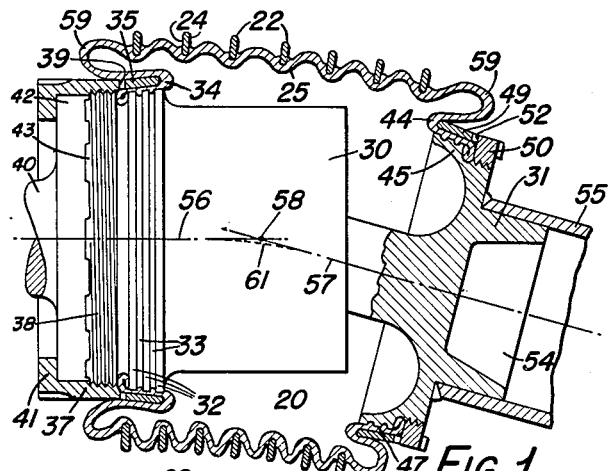
INVENTOR.
ERNEST WILDHABER
BY
ATTORNEY July 24, 1956  E. WILDHABER  2,755,643
FLEXIBLE SEAL FOR UNIVERSAL JOINTS
Filed July 5, 1950  2 Sheets-Sheet 2

INVENTOR.
ERNEST WILDHABER
BY
ATTORNEY

United States Patent Office 2,755,643
Patented July 24, 1956

2,755,643

FLEXIBLE SEAL FOR UNIVERSAL JOINTS

Ernest Wildhaber, Brighton, N. Y.

Application July 5, 1950, Serial No. 172,130

2 Claims. (Cl. 64—32)

The present invention relates to flexible seals, and particularly to seals for sealing oil or grease in and around universal joints.

Difficulties are always experienced in providing a good seal for fast-running universal joints for anything but very moderate, sustained shaft angles. One difficulty resides in the rapid flexing and unflexing required of the seal. Where the speed of rotation is high, the seal is subjected to pressure tending to expand the seal. Such pressure may be caused through the inertia of the rotating masses of oil or grease, that is, through centrifugal force, or, in other applications, it may be caused by direct hydraulic pressure. The seal must be strong enough to withstand the internal pressures and the loads and abuse it has to take in service. Ordinarily, this means that the seal walls should be thick enough to take the load, but this very thickness and strength hampers the flexing of the seal, and is, therefore, a disadvantage.

The present invention has among other objects, the purpose of providing a flexible seal for fast-running universal joints which will be satisfactory at large shaft angles and at high speeds of rotation, and which will be moderate in cost.

Another object of the invention is to provide a flexible seal which will perform its function with less flexing.

A further object of the invention is to provide a seal in which the function of strength is separated from the function of flexing so that parts of the seal are very flexible and other parts provide the necessary strength, the flexible parts not being strong enough in themselves to sustain the seal and the strength being provided by other parts which in themselves are not flexible enough for the usage to which the seal is subjected.

A further object of the invention is to provide a flexible seal of the character described which is generally cylindrical in shape so as to make for better flexing and lower cost in manufacture.

Another object of the invention is to provide a seal of generally cylindrical shape having circular reinforcing ribs in it to provide strength against internal pressure tending to expand the seal.

Another object of the invention is to provide a seal of generally cylindrical shape having circular reinforcing ribs of stronger and harder material than the connecting parts of the seal.

A further object of the invention is to provide a seal of generally cylindrical shape having circular reinforcing ribs in which the circular ribs are made of a different composition from but of rubber-like material basically similar to the connecting parts of the seal.

A still further object of the invention is to provide a flexible seal capable of being produced in a rotary process by centrifugal action.

Another object of the invention is to provide a flexible seal which may be made in a centrifugal operation in which the outer portion is made of a harder composition and is first formed and the inner portion is made of a more flexible composition and is applied before the outer portion has set.

Other objects of the invention will appear hereinafter from the specification and from the recital of the appended claims.

In the drawings:

Fig. 1 is an axial section of a seal made according to one embodiment of the present invention, showing the seal secured to and surrounding a universal joint, and showing the means for connecting the seal to the two members of the joint, part of one member of the joint being broken away and shown in section;

Fig. 2 is a transverse section of the seal of Fig. 1;

Fig. 3 is an axial section showing a seal made according to a modification of the invention and applied to a universal joint, one member of the joint again being shown in section;

Fig. 4 is a fragmentary axial section of a seal made according to a further modification of the invention;

Fig. 5 is a fragmentary axial section of a seal made according to another modification of the invention;

Figure 6:
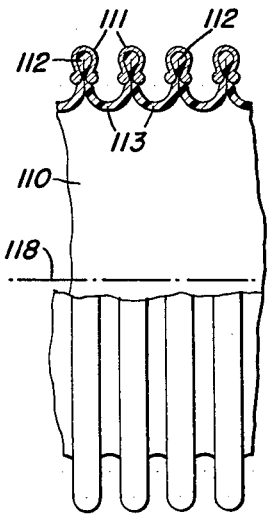
Fig. 6 is a fragmentary part side elevation, part axial section of a seal made according to a still further modification of the invention.

Referring now to the drawings and first to Figs. 1 and 2, 20 denotes a seal constructed according to one embodiment of the invention. This seal has a tubular body portion made of a synthetic rubber or a rubber-like material, such as neoprene, in which are embedded at spaced points reinforcing rings 22. These rings may be made of steel or other metal, and are bonded to the body portion of the seal. They enable the seal to carry the pressure or outward load caused by the oil or grease contained within the seal and by the mass of the seal itself rotating at high speed. The rings 22 are all alike. They have parallel plane sides 24. They have greater radial dimension than axial thickness. In its natural, unstressed state, the body portion has a cylindrical inside surface 25. This makes it possible, as will be described in more detail hereinafter, to produce a seal by a centrifugal process without an inner mold.

Fig. 1 shows one way in which the seal may be secured to the two members 30 and 31 of a known universal joint.

Here the joint member 30 is formed with a slightly tapered outside surface 32 having a plurality of circular grooves 33 formed in it. The end 34 of the seal is wedged between the outside surface 32 of the joint member 30 and the inside surface of a clamping ring 35 which is forced axially onto the seal. The outmost end of the seal extends somewhat beyond the wedged-in portion so that the seal end is held securely and tightly on the tapered portion 32 of the joint member with the grooves 33 further helping to hold it against axial displacement.

The clamping ring 35 may be moved to clamping position by a nut 37 which threads onto the threaded portion 38 of the joint member 30. The clamping ring has face teeth 39 on it which may be engaged by a conventional wrench, for loosening the ring, after the nut 37 has been backed away. In the structure shown in Fig. 1, the nut 37 serves also to clamp the drive shaft or driven shaft 40 to the member 30 of the joint. For this purpose, the nut 37 is provided with a flange 41, which engages over the flange 42 of the shaft 40. The opposed end faces of the shaft 40 and the joint member 30 are provided with face teeth constituting a face coupling 43.

At its opposite end 44, the seal 20 is similarly connected with an enlarged portion 45 of joint member 31. The end 44 is wedged between the tapered peripheral surface 47 of the part 45 of joint member 31 and a clamping ring 49. A nut 50, which threads onto the projection 45, presses the ring 49 axially to tighten the seal on the joint member 31. The clamping ring 49 has face teeth 52 adapted to be engaged by a wrench when it is to be loosened. The joint member 31 has a stub end 54 which fits into and is secured to a tubular steel shaft 55 by welding.

If desired any other suitable tight connection between the seal and the two members of the joint may be used. For instance, the ends 34 and 44 of the seal might be bonded to the two members 30 and 31 of the joint or might be secured with wires thereto.

The axes of the two members 30 and 31 of the joint are denoted at 56 and 57, respectively. They intersect in the point 58. It will be noted that the seal is attached to the two members of the joint, therefore, at opposite sides of the apex 58 of the joint. With this arrangement, the center line 61 of the tubular seal has a single curvature and a moderate one at that. The bending strains and bending stresses on the seal are, therefore, small, and the seal is subjected, therefore, to minimum fatigue.

In the embodiment of the invention shown in Fig. 1, the seal 20 is shown as connected to the two members of the joint so that loops 59 are provided at opposite ends of the seal. This is desirable where the universal joint has axial freedom, that is, where the two members of the joint are connected to move freely axially relative to one another. The loops 59 are, however, not a necessity. For joints without axial freedom I preferably dispense with these loops. In such cases a seal of the general shape shown in Fig. 3 may be used.

The seal 60 of Fig. 3 has further differences from the seal 20 of Figs. 1 and 2. The reinforcing rings 62 of the seal 60 are not made of metal. They are made of a rubber-like substance, such as neoprene, but which is of harder and more rigid composition than the connecting body portion 63 of the seal. The undulations 64 in the seal body may be produced by simply taking a seal which has a cylindrical inside surface and mounting the opposite ends 65 and 66 of the seal at a closer distance to one another than their distance apart in the nautral, unstressed position fo the seal. While this puts some initial compressive stress on the seal, this stress component is constant and does not reverse. Furthermore, compressive stresses are less harmful to rubber-like substances than are tension stresses. An initial compressive stress reduces whatever tension stresses may occur and is useful also for that reason.

The ends 65 and 66 of the seal are shown secured by wedging the ends onto the slightly tapered surfaces 67 and 68, respectively, of the ring members 69 and 70, respectively, by clamping rings 71 and 72, respectively. The ring member 69 is threaded onto one member 75 of the joint, and is secured thereto, also, by screws 76. The joint member 75 is secured to the shaft 80 through face coupling teeth 81 on the opposed faces of the shaft and joint member 75. These are held in engagement by the nut 69 and a neoprene ring 83 which is interposed between the nut and the head of the shaft 80. A nut 85, which threads onto the nut 69, serves to tighten the clamping ring 71 and to secure it in position.

The ring member 70 is held to the joint member 77 by a nut 78 which threads onto the joint member and which abuts against the ring member 70. The ring member 70 abuts against a neoprene ring 88 which is disposed between ring member 70 and the shoulder of joint member 77. Tubular shaft 91 is welded to joint member 77.

The clamping ring 72 is held in place axially on the part 70 by a snap ring 89.

Another modification of the invention is shown in Fig. 4. The seal 90 here shown is a cylindrical bellows in its natural, unstressed form. It has loop portions which have plane sides 93 that are reinforced by fibre or bonded wire reinforcements 94. These relatively stiff and strong parts furnish the strength to withstand centrifugal loads and pressures. These stiff parts are connected alternately at the outside and inside by the more elastic portions 95 and 96 of the loops.

This form of seal flexes a minimum at a given shaft angle. A slight torsional twist of the portions 97 which contain the reinforcements 94 lets the connecting portions 95 and 96 keep an almost constant curvature on their entire peripheries. This torsional twist does not introduce any appreciable stress even in the reinforced portion.

While this form of seal is excellent for keeping stresses down, its manufacture is more complicated than the previously described embodiments of the invention. First a part of the seal is made, for instance, by molding, with half the wall thickness of the final seal. Then the reinforcement 94 is applied at the sides of loop portions of this half of the seal by embedding in it the threads or wire, preferably before the material has set. Thereafter the remaining wall thickness is applied.

Fig. 5 shows an embodiment of a bellows type seal where the plane sides 103 of the loop portions 102 are reinforced by increasing the wall thickness rather than by providing a different material. This simplifies manufacture.

A further embodiment of the invention is illustrated in Fig. 6. Here the seal 110 is made from a cylindrical tube of rubber-like substance such as neoprene, and from U-shaped reinforcing rings 111 which are provided for holding the looped portions 112 of the seal. The rings 111 clamp these circular loop portions 112 and securely hold them. The rings 111 may simply be pinched over the loop portions of the seal, but an adhesive or connecting medium may also be used, if desired, for increased hold. The undulations 113 in the seal may be produced by moving the seal ends together and thus compressing the seal.

Figure 7:
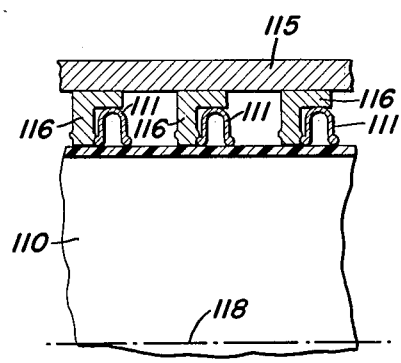
Figs. 7 and 8 are fragmentary axial sections showing successive steps in the manufacture of a seal of the type shown in Fig. 6.
Figure 8:
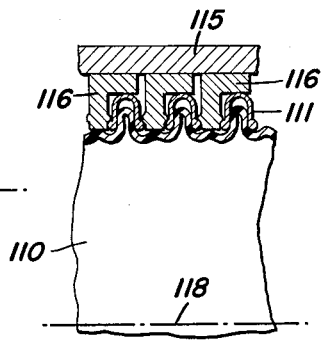

For small-quantity production the clamping rings 111 may be put on one by one by rolling or by pressing. For larger production I prefer to use a procedure such as illustrated in Figs. 7 and 8. Here, 115 denotes a tubular rotary drum on the inside surface of which is slidably mounted a plurality of L-shaped rings 116, each of which is split into two semi-circular parts. Against each of these rings 116 there is set a clamping member 111. The rings 87 are initially positioned with a gauge to so as to be uniformly spaced apart axially fo the drum, the spacing pitch being large enough to allow for subsequent reduction to the final pitch of the clamping rings, this reduction being necessary to provide the waves or undulations in the flexible tube.

After the rings 116 and 111 are properly spaced, the cylindrical tube 110, which is to form the body of the seal, is introduced. The drum 115 is then rotated on its axis 118 while the rings 116 are moved axially toward one another carrying with them the clamping rings 111. Coaxial rollers may be used for moving the wall of the tube 110 inside of the open mouths of the circular clamping rings 111. The axes of such rollers would be parallel to the axis 118. This action of the rollers will start to draw the rings together. After withdrawing the rollers, the drum 115 is rotated at higher speed. The wall of the tube 110 is then sucked into the mouths of the clamping rings 111 by centrifugal force with the result that the rings are drawn still further together until they reach the position shown in Fig. 8. Here the rings 116 are in contact with the clamping rings 111 on both sides. The rings 116 are then further moved axially together by strong pressure, preferably hydraulic pressure. This causes the clamping rings 111 to be deformed to the shapes shown in Fig. 6 to clamp the loops of the flexible tube 110.

The axial displacement of the rings 116 is somewhat opposed by friction at their areas of contact with the cylindrical inside surface of the drum 115. This friction can be reduced by proper lubrication or by the addition of one piece rings holding the split rings 116 and extending outside of them. Such rings would move entirely with the split rings 116 and keep their centrifugal forces in balance. Hence, there would be little load and little friction between these added rings and the rotary drum 115 in which they move axially.

In Figs. 6 to 8 inclusive, the rubber-like tube 110 is shown cross-hatched to denote it is made of rubber so that the portions of the rubber-like tubing 110 may be clearly distinguished from the clamping rings 111. In other figures, conventional cross-hatching is employed for the rubber-like parts for clearness in illustration. For instance, in Fig. 4 if the tubing 90 were cross-hatched for rubber it would be impossible to see the fabric or wire inserts 94.

Figure 9:
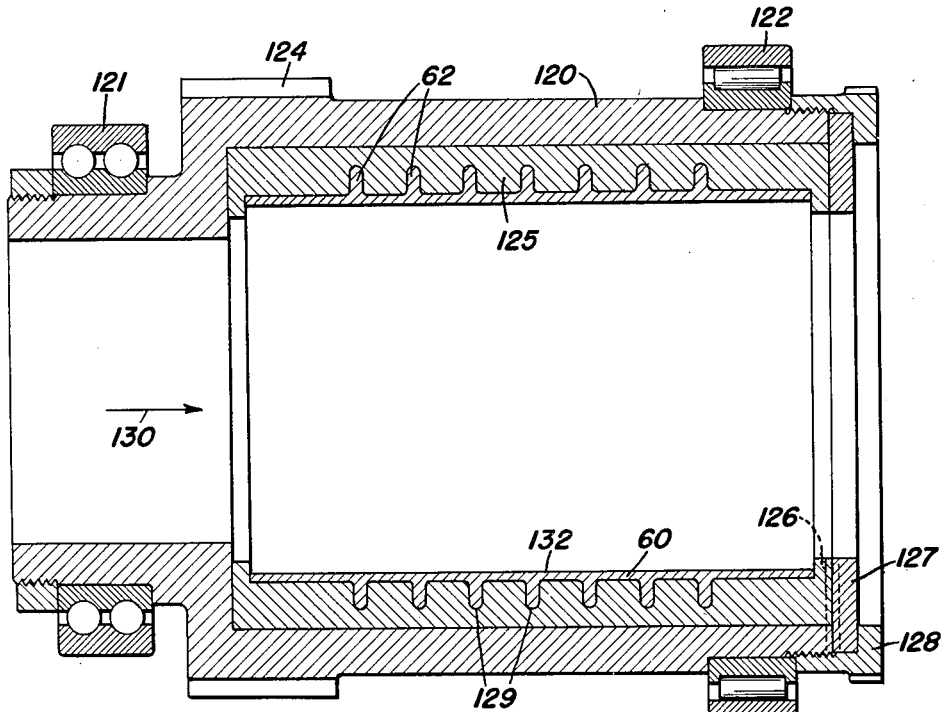
Fig. 9 is an axial section of an apparatus for making seals of the type shown in Fig. 3, and illustrating somewhat diagrammatically the method of making this seal through application of centrifugal force.

Fig. 9 illustrates a centrifugal process of making seals of the type illustrated in Fig. 3.

A rotary drum 120 is provided which is mounted on antifriction bearings 121 and 122. It is driven by a gear 124 which is integral with it. A split outer mould 125 is secured on the inside of the member 120. It is constrained to rotate with the member 120 through a key 126 provided on one end plate 127 of the drum 120. This end plate is secured to the drum 120 by a nut 128. Again, no mold is required for the inside of the seal 60.

The mold 125 is provided internally with circular grooves 129 in which the ribs 62 of the seal 60 may be formed. The material from which the seal is to be made, is introduced into the mold 125 in the general direction of the arrow 130 and keeps filling the region furthest away radially from the axis of rotation. No air is trapped since the inside of the mold is completely open. A perfect cylindrical inside surface 132 is therefore formed on the seal 60. To obtain reinforcing rings 62 of harder composition, the material from which they are made is introduced first, into the mold 125. The composition, from which the connecting portions of the seal are to be formed, is introduced into the mold, before the first composition has set and while a good connection can be provided. This is done while the drum 120 keeps on spinning. A seal 60 is therefore made which has a flexible part with an outer harder and an inner softer material by first introducing the outer material and then before the outer material has set, introducing the inner material. The separations is obtained by introducing the different materials at different times successively.

In a modification of the process of manufacture, I provide harder and softer compositions of different specific weights, the harder composition having the heavier specific weight or gravity. For instance, I may use parts of fine metal wires, or metal shot, or metal powder in the outer composition. The metal, preferably steel, should be treated for bonding. The whole composition, thoroughly mixed, is then introduced at the same time into the mold 125 carried by the spinning drum 120. Centrifugal force will then direct the heavier parts to the outer portions of the seal and keep them there. To obtain uniform results the process should be performed at a predetermined speed maintained for a predetermined time.

While the invention has been described in connection with several different embodiments thereof, it will be understood that it is capable of further modification, and this application is intended to cover any variations, uses, or adaptations of the invention, following, in general, the principles of the invention and including such departures of the present disclosure as come within known or customary practices in the art to which the invention pertains and as may be applied to the essential features hereinbefore set forth and as fall within the scope of the invention or the limits of the appended claims.

Having thus described my invention, what I claim is:

1. In combination, a universal joint for connecting two members whose axes intersect, and a flexible tubular seal which is so secured to said two members at opposite sides of the point of intersection of said axes that the distance between the ends of the seal is less than the length of the seal in its natural, unstressed state, said seal having a plurality of axially-spaced, outwardly-projecting, reinforcing rings, and, in its natural, unstressed state, a cylindrical inside surface which extends from end to end of the seal, said rings, in the unstressed state of the seal, being axially-spaced from one another a distance greater than the maximum thickness of said body portion, and the thickness of the complete seal being as small midway between adjacent rings as anywhere along the length of the seal.

2. In combination, a universal joint comprising two members whose axes intersect, a flexible seal for enclosing said joint, said seal having a tubular body portion and a plurality of axially-spaced reinforcing rings, said body portion having in its unstressed state a cylindrical inside surface which reaches from end to end of the seal, and being mounted with its ends approached to one another whereby it becomes undulatory in longitudinal section, each of said two members having a ring portion secured thereto which has a tapered, ribbed peripheral surface, and means for securing the body portion of said seal at each of its ends over said tapered, ribbed surfaces comprising a clamping ring adapted to fit over an end of said body portion, said clamping rings being adapted to be moved axially for clamping the seal to or unclamping it from said two members, and said reinforcing rings extending outwardly of the body portion of said seal and being of harder material than said body portion and being spaced axially from one another a distance greater than the maximum thickness of said body portion.

References Cited in the file of this patent

UNITED STATES PATENTS

| | | |
|---|---|---|
| 1,367,792 | Arbuckle | Feb. 8, 1921 |
| 1,705,622 | Mallory | Mar. 19, 1929 |
| 1,995,977 | Gonda | Mar. 26, 1935 |
| 2,264,728 | Stillwagon et al. | Dec. 2, 1941 |
| 2,325,019 | Rubissow | July 20, 1943 |
| 2,372,302 | Swindin | Mar. 27, 1945 |
| 2,387,486 | Zellos | Oct. 23, 1945 |
| 2,403,298 | Payne | July 2, 1946 |
| 2,534,635 | Stillwagon | Dec. 19, 1950 |

FOREIGN PATENTS

| | | |
|---|---|---|
| 18,328 | Australia | 1934 |